US012690071B2

(12) United States Patent (10) Patent No.: US 12,690,071 B2
Gao (45) Date of Patent: Jul. 21, 2026

(54) RANDOM ACCESS METHOD, AND ELECTRONIC DEVICE AND STORAGE MEDIUM

(71) Applicant: NEW H3C TECHNOLOGIES CO., LTD., Zhejiang (CN)

(72) Inventor: Tingting Gao, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 314 days.

(21) Appl. No.: 18/571,451

(22) PCT Filed: Nov. 22, 2022

(86) PCT No.: PCT/CN2022/133550
§ 371 (c)(1),
(2) Date: Dec. 18, 2023

(87) PCT Pub. No.: WO2023/093729
PCT Pub. Date: Jun. 1, 2023

(65) Prior Publication Data
US 2024/0298353 A1 Sep. 5, 2024

(30) Foreign Application Priority Data
Nov. 23, 2021 (CN) .......................... 202111397106.6

(51) Int. Cl.
*H04W 74/08* (2024.01)
*H04W 52/36* (2009.01)
(Continued)

(52) U.S. Cl.
CPC ..... *H04W 74/0833* (2013.01); *H04W 52/367* (2013.01); *H04W 74/0875* (2013.01)

(58) Field of Classification Search
None
See application file for complete search history.

(56) References Cited

U.S. PATENT DOCUMENTS 8,285,286 B2 * 10/2012 Lee ...................... H04W 52/50
370/252
9,019,823 B1 4/2015 Raparthy et al.
(Continued)

FOREIGN PATENT DOCUMENTS

CN 102342039 A 2/2012
CN 104285491 A 1/2015
(Continued)

OTHER PUBLICATIONS

Japanese Patent Office , Office Action Issued in Application No. 2023-578112, Jan. 7, 2025, 10 pages.
(Continued)

*Primary Examiner* — Sai Aung
(74) *Attorney, Agent, or Firm* — Greenblum & Bernstein, P.L.C.

(57) ABSTRACT

Provided in the present application are a random access method, and an electronic device and a storage medium. In the method, for different services, different preamble ranges are delineated and different priorities are set, such that each user terminal selects a preamble from within a preamble range corresponding to a service that is borne by the user terminal itself and sends the preamble to a base station; and the base station responds to the access of the user terminals according to the priorities of services corresponding to the acquired preambles, and the access of the user terminal that bears a service having a high priority (having a higher requirement for a delay) is preferentially responded to thereby.

9 Claims, 3 Drawing Sheets

(51) Int. Cl.

| | |
|---|---|
| *H04W 72/04* | (2023.01) |
| *H04W 72/12* | (2023.01) |
| *H04W 74/0833* | (2024.01) |

(56) References Cited

U.S. PATENT DOCUMENTS

| | | | | |
|---|---|---|---|---|
| 9,426,828 | B1 | 8/2016 | Singh et al. | |
| 2010/0041428 | A1* | 2/2010 | Chen | H04W 52/367 |
| | | | | 455/522 |
| 2013/0301541 | A1 | 11/2013 | Mukherjee et al. | |
| 2016/0381713 | A1 | 12/2016 | Hwang | |
| 2018/0124822 | A1 | 5/2018 | Wang et al. | |
| 2018/0124835 | A1 | 5/2018 | Lee | |
| 2021/0289561 | A1* | 9/2021 | Liu | H04W 52/36 |
| 2023/0083993 | A1* | 3/2023 | Rune | H04W 74/0833 |
| | | | | 370/329 |
| 2023/0131368 | A1* | 4/2023 | Jang | H04W 24/08 |
| | | | | 370/216 |
| 2023/0199859 | A1* | 6/2023 | Li | H04W 74/0833 |
| | | | | 370/329 |
| 2023/0224953 | A1* | 7/2023 | Xiong | H04L 1/0009 |
| | | | | 370/329 |
| 2023/0328794 | A1* | 10/2023 | Cheng | H04W 48/18 |
| | | | | 370/329 |
| 2025/0212248 | A1* | 6/2025 | Gao | H04W 72/54 |

FOREIGN PATENT DOCUMENTS

| | | | |
|---|---|---|---|
| CN | 105072700 | A | 11/2015 |
| CN | 108024386 | A | 5/2018 |
| CN | 109845378 | A | 6/2019 |
| CN | 110583092 | A | 12/2019 |
| EP | 2705720 | B1 | 1/2015 |
| JP | 2021180506 | A | 11/2021 |
| KR | 20170000774 | A | 1/2017 |
| WO | 2010107354 | A1 | 9/2010 |
| WO | 2013069994 | A1 | 5/2013 |
| WO | 2014199978 | A1 | 12/2014 |
| WO | 2017094299 | A1 | 6/2017 |
| WO | 2021219434 | A1 | 11/2021 |
| WO | 2021219690 | A1 | 11/2021 |
| WO | 2021219723 | A1 | 11/2021 |

OTHER PUBLICATIONS

Apple Inc., "Further analysis of FR2 power control tolerance", 3GPP TSG-RAN4 WG Meeting #88bis, R4-1812394, Chengdu, China, Oct. 8-12, 2018, 7 pages.

3GPP; TSG RAN; NR; Medium Access Control(MAC) protocol specification (Release 16), 3GPP TS 38.321 V16.6.0 (Sep. 2021), Sep. 2021, pp. 142-144, 147-150.

European Patent Office, Extended European Search Report Issued in Application No. 22897812.8, Sep. 18, 2024, Germany, 11 pages.

CATT:"Consideration on RACH resource configuration and RACH reattempt", R2-1704254, 3GPP TSG-RAN WG2 Meeting #98, Hangzhou, China, May 15-19, 2017, 4 pages.

ISA State Intellectual Property Office of the People's Republic of China, Written Opinion of the International Searching Authority Issued in Application No. PCT/CN2022/133550, Jan. 28, 2023, WIPO, 7 pages.

ISA State Intellectual Property Office of the People's Republic of China, International Search Report Issued in Application No. PCT/CN2022/133550, Jan. 28, 2023, WIPO, 4 pages.

Peng et al. "Low power listening MAC protocol with collision avoidance and traffic adaption", Application Research of Computers, vol. 30, No. 9, Sep. 2013, English Abstract, 4 pages.

Li et al."Control Algorithm of TD-LTE Random Access Preamble Priority Level", Computer Engineering, vol. 38, No. 12, Jun. 2012, English Abstract, 3 pages.

* cited by examiner

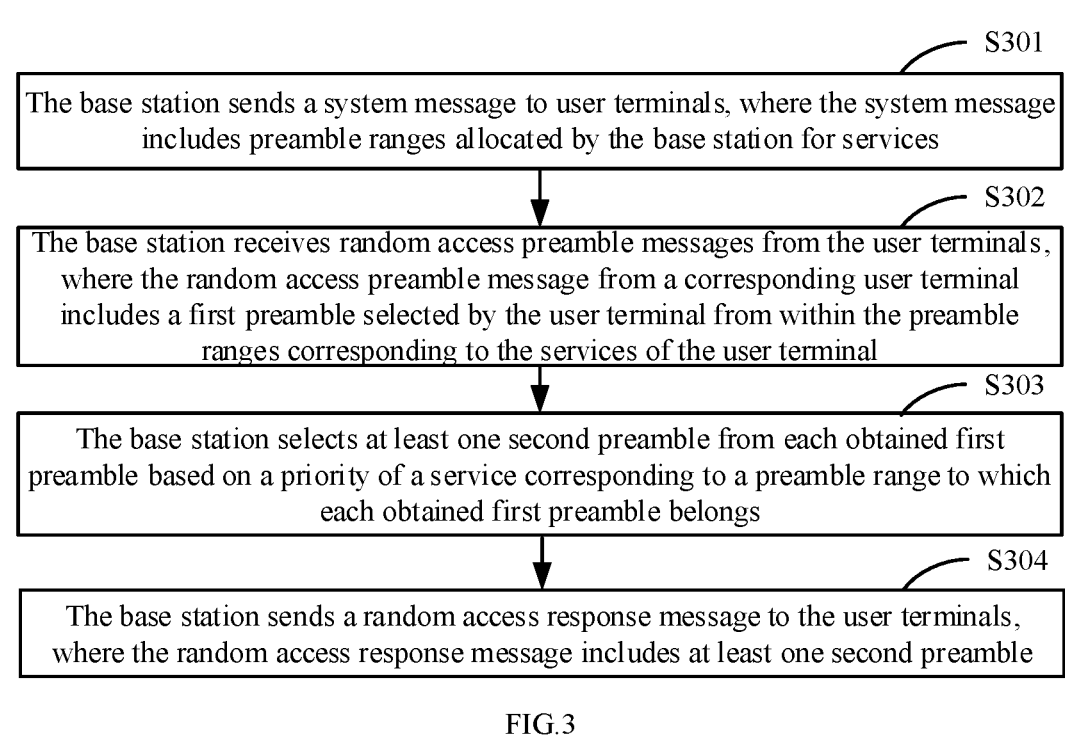

S301

The base station sends a system message to user terminals, where the system message includes preamble ranges allocated by the base station for services

S302

The base station receives random access preamble messages from the user terminals, where the random access preamble message from a corresponding user terminal includes a first preamble selected by the user terminal from within the preamble ranges corresponding to the services of the user terminal

S303

The base station selects at least one second preamble from each obtained first preamble based on a priority of a service corresponding to a preamble range to which each obtained first preamble belongs

S304

The base station sends a random access response message to the user terminals, where the random access response message includes at least one second preamble

FIG.3

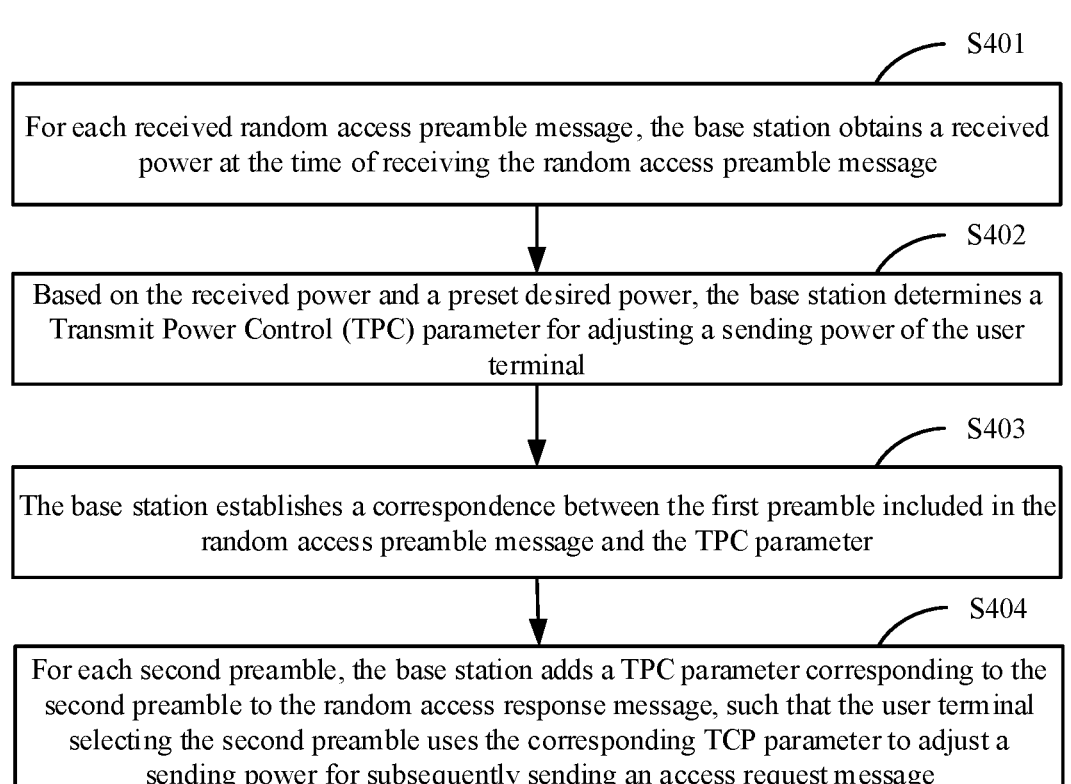

S401

For each received random access preamble message, the base station obtains a received power at the time of receiving the random access preamble message

S402

Based on the received power and a preset desired power, the base station determines a Transmit Power Control (TPC) parameter for adjusting a sending power of the user terminal

S403

The base station establishes a correspondence between the first preamble included in the random access preamble message and the TPC parameter

S404

For each second preamble, the base station adds a TPC parameter corresponding to the second preamble to the random access response message, such that the user terminal selecting the second preamble uses the corresponding TCP parameter to adjust a sending power for subsequently sending an access request message

FIG.4

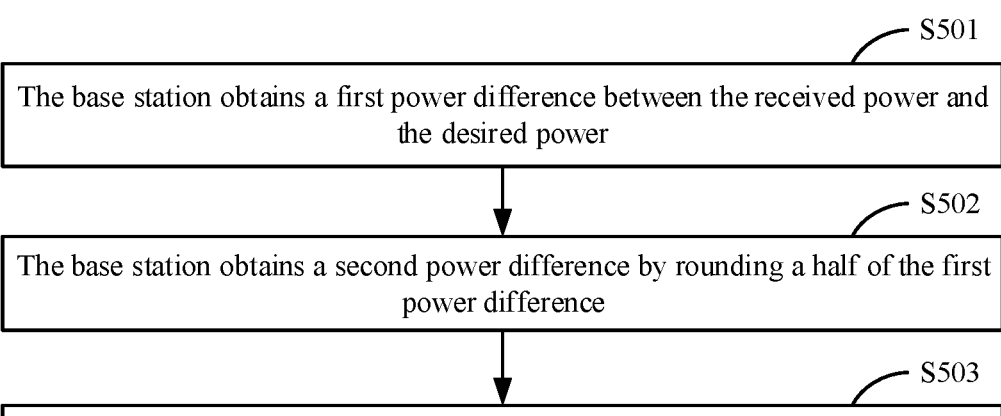

S501

The base station obtains a first power difference between the received power and the desired power

S502

The base station obtains a second power difference by rounding a half of the first power difference

S503

The base station queries for a TPC parameter corresponding to the second power difference in a correspondence between preset power differences and TPC parameters, and the TPC parameter corresponding to the second power difference is taken as the TPC parameter for adjusting the sending power of the user terminal

FIG.5

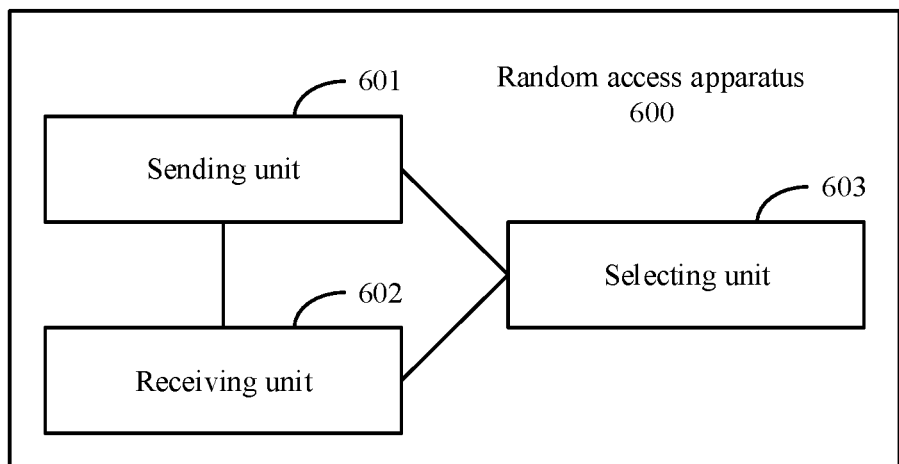

Random access apparatus 600

601

Sending unit

603

Selecting unit

602

Receiving unit

FIG.6

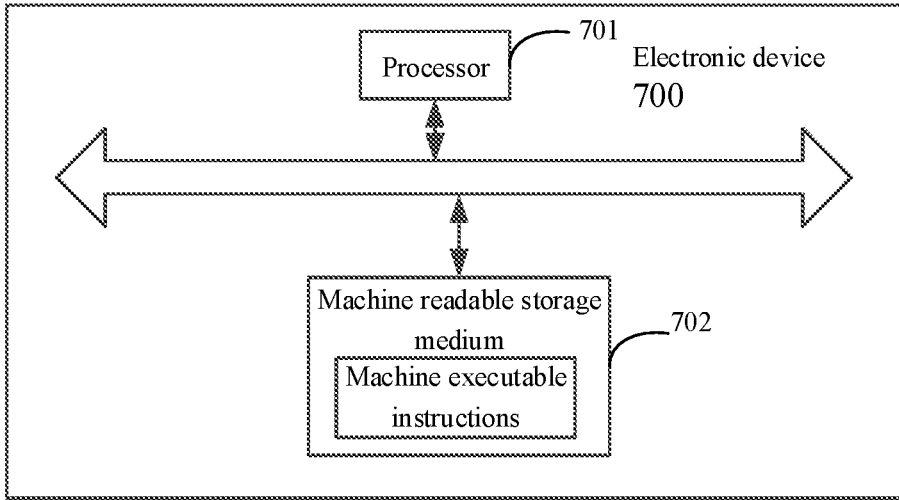

701

Processor

Electronic device 700

Machine readable storage medium

702

Machine executable instructions

FIG.7

RANDOM ACCESS METHOD, AND ELECTRONIC DEVICE AND STORAGE MEDIUM

CROSS REFERENCE TO RELATED APPLICATIONS

The present application is a U.S. National Stage of International Application No. PCT/CN2022/133550 filed on Nov. 22, 2022, the contents of which are incorporated herein by reference in its entireties for all purposes.

TECHNICAL FIELD

The present disclosure relates to the field of communication technologies, and in particular to a random access method, an electronic device and a storage medium.

BACKGROUND

Random access is a basic processing mechanism in a wireless communication network. A user terminal establishes a wireless link with a base station through random access, so as to achieve uplink synchronization and obtain uplink resources. Based on this, a service connection can be established so as to achieve data interaction between the terminal and the base station.

Random access mainly includes a contention-based random access and a contention-free random access. The contention-based random access refers to a manner in which, each user terminal randomly selects a preamble to originate access to a base station, but some of the user terminals possibly select the same preamble to bring contention, and finally, the user terminals achieve access through a contention resolution mechanism.

In the contention-based random access, based on a sequence of the received preambles, the base station returns a random access response message to the corresponding user terminal sequentially. The response speed of returning the random access response message directly affects an access latency of the user terminal. In some highly demanding application scenarios for access latency, the existing random access manners still have the problem of high access latency.

SUMMARY

In view of this, the present disclosure provides a random access method and apparatus so as to reduce access latency.

In order to achieve the above application object, the present disclosure provides the following technical solution.

According to a first aspect of the present disclosure, there is provided a random access method, which is applied to a base station. The method includes: sending a system message to user terminals, where the system message includes preamble ranges allocated for services, and priorities of services are pre-configured on the base station; receiving random access preamble messages from the user terminals, where the random access preamble message from a corresponding user terminal includes a first preamble selected by the user terminal from within the preamble ranges corresponding to services of the user terminals; based on the priority of the service corresponding to a preamble range to which each of obtained first preambles belongs, selecting at least one second preamble from the first preambles; sending a random access response message to the user terminals, where the random access response message includes the at least one second preamble.

Optionally, before sending the random access response message to the user terminals, the method further includes: for each received random access preamble message, obtaining a received power at the time of receiving the random access preamble message; based on the received power and a preset desired power, determining a transmit power control (TPC) parameter for adjusting a sending power of the user terminal; establishing a correspondence between the first preamble included in the random access preamble message and the TPC parameter; for each second preamble, adding the TPC parameter corresponding to the second preamble to the random access response message, such that the user terminal selecting the second preamble uses the corresponding TPC parameter to adjust a sending power for subsequently sending an access request message.

Optionally, based on the received power and the preset desired power, determining the transmit power control (TPC) parameter for adjusting the sending power of the corresponding user terminal includes: obtaining a first power difference between the received power and the desired power; obtaining a second power difference by rounding a half of the first power difference; querying for a TPC parameter corresponding to the second power difference in a correspondence between preset power difference and TPC parameter and taking the TPC parameter corresponding to the second power difference as the TPC parameter for adjusting the corresponding sending power of the user terminal.

Optionally, the method further includes: receiving a re-access request message sent by the user terminal receiving the random access response message in a re-access process, where the re-access request message includes an identifier of the user terminal and the identifier of the user terminal is present in a first sub-protocol data unit (PDU) included in the re-access request message; by analyzing the first sub-PDU, obtaining the identifier of the user terminal which currently perform the re-access process.

Optionally, before sending the random access response message to the user terminals, the method further includes: based on an ascending order of size of the second preambles, adding each second preamble to the random access response message sequentially, such that the user terminal stops traversing upon traversing out a second preamble equal to or greater than the preamble of the user terminal in size; or, based on a descending order of size of the second preambles, adding each second preamble to the random access response message sequentially, such that the user terminal stops traversing upon traversing out a second preamble equal to or less than the preamble of the user terminal in size.

According to a second aspect of the present disclosure, there is provided a random access apparatus, which is applied to a base station. The apparatus includes: a sending unit, configured to send a system message to user terminals, where the system message includes preamble ranges allocated for services, and priorities of services are pre-configured on the base station; a receiving unit, configured to receive random access preamble messages from the user terminals, where the random access preamble message from a corresponding user terminal includes a first preamble selected by the user terminal from within the preamble ranges corresponding to services of the user terminal; a selecting unit, configured to, based on the priority of the service corresponding to a preamble range to which each of obtained first preambles belongs, select at least one second preamble from the first preambles; where the sending unit is further configured to send random access response message to the user terminals, and the random access response message includes the at least one second preamble.

Optionally, the apparatus further includes: an obtaining unit, configured to, for each of the received random access preamble messages, obtain a received power at the time of receiving the random access preamble message; a determining unit, configured to, based on the received power and a preset desired power, determine a transmit power control (TPC) parameter for adjusting a sending power of the corresponding user terminal; an establishing unit, configured to establish a correspondence between the first preamble included in the random access preamble message and the TPC parameter; an adding unit, configured to, for each second preamble, add the TPC parameter corresponding to the second preamble to the random access response message, such that the user terminal selecting the second preamble uses the corresponding TPC parameter to adjust a sending power for subsequently sending an access request message.

Optionally, based on the received power and the preset desired power, determining the transmit power control (TPC) parameter for adjusting the sending power of the corresponding user terminal includes: obtaining a first power difference between the received power and the desired power; obtaining a second power difference by rounding a half of the first power difference; querying for a TPC parameter corresponding to the second power difference in a correspondence between preset power differences and TPC parameters and taking the TPC parameter corresponding to the second power difference as the TPC parameter for adjusting the corresponding sending power of the user terminal.

Optionally, the receiving unit is further configured to receive a re-access request message sent by the user terminal receiving the random access response message in a re-access process, where the re-access request message includes an identifier of the user terminal and the identifier of the user terminal is present in a first sub-protocol data unit (PDU) included in the re-access request message; and the apparatus further comprises: an analyzing unit, configured to, by analyzing the first sub-PDU, obtain the identifier of the user terminal which currently perform the re-access process.

Optionally, the adding unit is further includes configured to, based on an ascending order of size of the second preambles, add each second preamble to the random access response message sequentially, such that the user terminal stops traversing upon traversing out a second preamble equal to or greater than the preamble of the user terminal in size; or, based on a descending order of size of the second preambles, add each second preamble to the random access response message sequentially, such that the user terminal stops traversing upon traversing out a second preamble equal to or less than the preamble of the user terminal in size.

According to a third aspect of the present disclosure, there is provided an electronic device. The electronic device includes a processor and a machine readable storage medium; the machine readable storage medium stores machine executable instructions executable by the processor; the processor is configured to execute the machine executable instructions to perform the steps of the above method.

According to a fourth aspect of the present disclosure, there is provided a non-transitory machine readable storage medium, storing machine executable instructions, where the machine executable instructions are executed by a processor to perform the steps of the above method.

It can be seen from the above that, in the embodiments of the present disclosure, different preamble ranges and different priorities are disposed for different services such that the user terminals select preambles from within preamble ranges corresponding to services borne by the user terminals and send the preambles to the base station. Thus, the base station responds to access of the user terminals based on a priority of a service corresponding to each obtained preamble. In this way, the accesses of the user terminals bearing the services of high priority (high requirements for latency) are responded preferentially, so as to improve the response efficiency of the entire system and reduce the access latency of the user terminals.

BRIEF DESCRIPTION OF THE DRAWINGS

In order to more clearly describe the technical solutions of the embodiments of the present disclosure, accompanying drawings required for descriptions of the embodiments will be briefly introduced below. Apparently, the drawings described hereunder illustrate only some embodiments of the present disclosure. Persons of ordinary skill in the arts may also obtain other drawings based on these drawings without making creative work.

FIG. 3 is a flowchart illustrating a random access method according to an embodiment of the present disclosure.

FIG. 4 is an implementation flowchart of adjusting a sending power of a user terminal according to an embodiment of the present disclosure.

FIG. 5 is an implementation flowchart of step 402 according to an embodiment of the present disclosure.

FIG. 6 is a structure schematic diagram illustrating a random access apparatus according to an embodiment of the present disclosure.

FIG. 7 is a hardware structure diagram illustrating an electronic device according to an embodiment of the present disclosure.

DETAILED DESCRIPTION OF THE EMBODIMENTS

Figure 1:
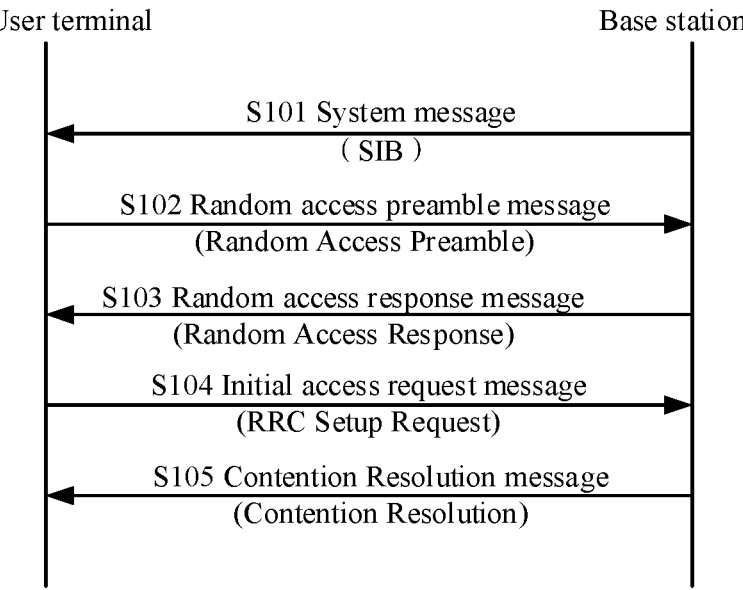
FIG. 1 is a schematic diagram illustrating an interaction flow of initial access of a user terminal.

Examples will be described in detail herein, with the illustrations thereof represented in the drawings. When the following descriptions involve the drawings, the like numerals in different drawings refer to the like or similar elements unless otherwise indicated. The embodiments described in the following examples do not represent all embodiments consistent with the present disclosure.

The terms used in the present disclosure are for the purpose of describing particular examples only, and are not intended to limit the present disclosure. Terms determined by "a", "the" and "said" in their singular forms in the embodiments of the present disclosure are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

In order to make the objects, technical solutions and advantages of the present disclosure clearer, the present disclosure will be detailed in combination with accompanying drawings and specific embodiments.

FIG. 1 is a schematic diagram illustrating an interaction flow of initial access of a user terminal. As shown in FIG. 1, the interaction flow may include steps S101 to S105.

At step S101, a base station sends a system message (e.g. System Information Block, SIB) to a user terminal.

At step S102, the user terminal sends a random access preamble message (e.g. Random Access Preamble) to the base station.

At step S103, the base station sends a random access response message (e.g. Random Access Response) to the user terminal.

At step S104, the user terminal sends an initial access request message (e.g. Radio Resource Control Setup Request) to the base station.

At step S105, the base station sends a Contention Resolution message to the user terminal.

After the message interaction shown in FIG. 1 is completed, the user terminal may access a wireless network.

Figure 2:
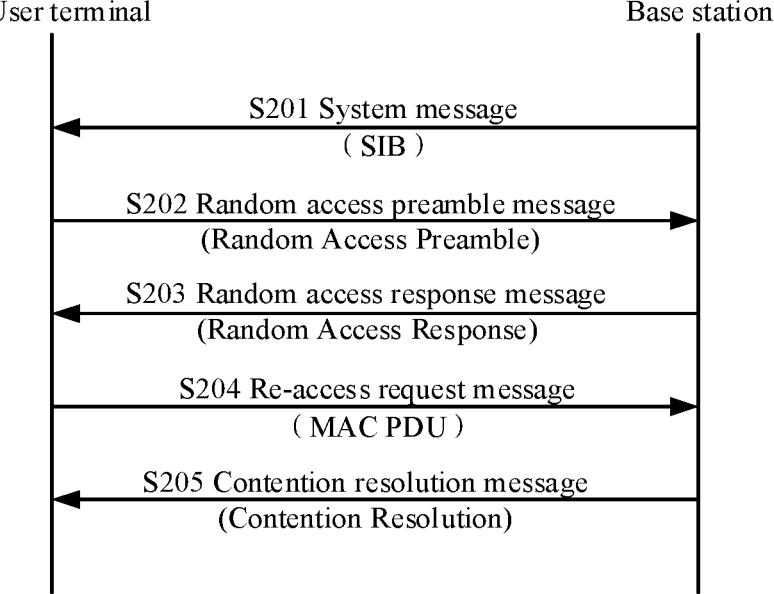
FIG. 2 is a schematic diagram illustrating an interaction flow of re-access of a user terminal.

FIG. 2 is a schematic diagram illustrating an interaction flow of re-access of a user terminal. As shown in FIG. 2, the interaction flow may include steps S201 to S205.

At step S201, the base station sends a system message to a user terminal.

At step S202, the user terminal sends a random access preamble message to the base station.

At step S203, the base station sends a random access response message to the user terminal.

At step S204, the user terminal sends a re-access request message to the base station. The re-access request message is formed in a Media Access Control (MAC) layer-based Protocol Data Unit (PDU) format (MAC PDU).

At step S205, the base station sends a contention resolution message to the user terminal.

After the message interaction shown in FIG. 2 is completed, the user terminal may re-access the wireless network. Generally, in the scenarios in which a number of terminal scheduling requests (SRs) exceeds a maximum number, or the terminal needs to send uplink data in an uplink non-synchronized state, or the terminal needs to send uplink data when the base station has not allocated a Physical Uplink Control Channel (PUCCH) resource for SR to the terminal, and the like, the terminal will perform a process for re-accessing the network.

In an embodiment of the present disclosure, based on the interaction flow shown in FIGS. 1 and 2, there is provided a random access method. As shown in FIG. 3, it is a flowchart illustrating a random access method according to an embodiment of the present disclosure. The flow is applied to a base station.

As shown in FIG. 3, the flow may include the following steps S301 to S304.

At step S301, the base station sends a system message to user terminals, where the system message includes preamble ranges allocated by the base station for services.

In an embodiment of the present disclosure, the base station may allocate different preamble ranges for different services in advance, and the preamble ranges are independent of each other without mutual overlapping.

The base station may send a system message carrying the preamble ranges allocated for the services to the user terminals. The preamble ranges carried in the system message may only include the preamble ranges corresponding to services borne by the user terminals, or may include the preamble ranges corresponding to all services.

The user terminals may obtain the preamble ranges carried in the system message from the system message sent by the base station.

At step S302, the base station receives random access preamble messages from the user terminals, where the random access preamble message from a corresponding user terminal includes a first preamble selected by the user terminal from within the preamble ranges corresponding to the services of the user terminal.

When a user terminal desires to access a wireless network, the user terminal may firstly determine its own service, i.e. a service borne by itself, for example, Ultra Reliable And Low Latency Communication (URLLC) service.

The user terminal may, based on the service borne by itself, query for a preamble range corresponding to the service borne by the user terminal in the preamble ranges obtained at step S301, and then select one preamble from within the preamble range.

Herein, the preamble selected by the user terminal is referred to as a first preamble. It can be understood that the naming of the first preamble is only for ease of distinguishing rather than limitation.

The user terminal may send a random access preamble message to the base station, where the random access preamble message may include the first preamble selected by the user terminal.

When receiving the random access preamble message, the base station may obtain the first preamble included in the received random access preamble message.

At step S303, the base station selects at least one second preamble from each obtained first preamble based on a priority of a service corresponding to a preamble range to which each obtained first preamble belongs.

In an embodiment of the present disclosure, the base station may pre-configure priorities of services. For example, a priority of a low latency service (service with strict requirements for latency) is set to be higher than priorities of other ordinary services.

In this step, the base station may sort the obtained first preambles based on the priorities of the services corresponding to the first preambles, where the first preambles with the same priority may be sorted in the order of their reception time.

Next, the base station may determine whether there is a resource currently available (a resource available for performing sending operation, for example, a memory or the like), and based on an amount of the available resource, determine a number of to-be-responded preambles and then select this number of to-be-responded (sent) preambles from the obtained first preambles. Specifically, based on a descending priority sequence of the services corresponding to the first preambles, the determined number of second preambles are selected from the first preambles. It can be understood that the naming of the second preamble is only for ease of distinguishing rather than limitation.

Furthermore, it is to be noted that if it is determined that no available resource is present, whether an available resource (the available resource changes over time) is present may be determined again after waiting for a preset time (the preset time is not limited herein). When an available resource is present, steps S303 and S304 may be performed.

At step S304, the base station sends a random access response message to the user terminals, where the random access response message includes at least one second preamble.

In this step, the base station may add each second preamble selected at step S303 to the random access response message to respond to an access request of the corresponding user terminal selecting the second preamble.

Till now, the flow shown in FIG. 3 is completed.

It can be seen from the flow shown in FIG. 3 that, in the embodiments of the present disclosure, different preamble ranges and different priorities are configured for different services such that the user terminals select preambles from within preamble ranges corresponding to services borne by the user terminals and send the preambles to the base station. Thus, the base station responds to accesses of the user terminals based on the priorities of the services corresponding to the obtained preambles. In this way, the accesses of the user terminals bearing the services of high priorities (high requirements for latency) are responded to preferentially, so as to improve the response efficiency of the entire system and reduce the access latency of the user terminals.

In an embodiment, the base station, when adding each second preamble to the random access response message, may sequentially add the second preambles to the random access response message based on a sequence of a preamble size. The preamble size may be determined, for example, by the size of a preamble index.

In this way, when a user terminal receives the random access response message, the user terminal may sequentially traverse each second preamble. If each second preamble is sequentially added to the random access response message based on an ascending order of size of the second preambles, when the user terminal traverses out a second preamble equal to or greater than the preamble selected by the user terminal in size, the user terminal stops traversing; if each second preamble is sequentially added to the random access response message based on a descending order of size of the second preambles, when the user terminal traverses out a second preamble equal to or less than the preamble selected by the user terminal in size, the user terminal stops traversing. In an embodiment of the present disclosure, the user terminal does not need to traverse all the second preambles, thereby improving the processing efficiency of the user terminal.

For example, when the base station adds each second preamble to the random access response message based on an ascending order of size, the user terminal may likewise perform sequential traversal based on the ascending order of size. If the user terminal fails to traverse out a second preamble same in size as the preamble of the user terminal but has traversed out a second preamble greater in size than the preamble of the user terminal, it is indicated that the base station does not respond to the user terminal. Therefore, the user terminal may stop traversing subsequent second preambles, so as to shorten a processing time of the user terminal and saving system resource of the user terminal.

As an embodiment, before sending the random access response message to the user terminals in step S304, the base station may further perform an implementation flow for adjusting sending powers of the user terminals shown in FIG. 4.

As shown in FIG. 4, the flow may include steps S401 to S404.

At step S401, for each received random access preamble message, the base station obtains a received power at the time of receiving the random access preamble message.

At step S402, based on the received power and a preset desired power, the base station determines a Transmit Power Control (TPC) parameter for adjusting a sending power of the user terminal.

Herein, it is to be noted that, for each received random access preamble message, the base station may measure one corresponding signal received power index for the message, where excessively large or small received power is not favorable for analysis for wireless signals by the base station. Thus, in an embodiment of the present disclosure, it is required to adjust a sending power of the user terminal for sending a subsequent message, such that the base station can obtain a wireless signal satisfying the desired received power, thereby improving analysis effect.

In view of the above, in this step, the base station may, based on the received power obtained at step S401 and the preset desired power, determine a TPC parameter for adjusting the sending power of the user terminal. The desired power is a preset received power which ensures the base station can obtain good analysis effect.

The specific process of determining the TPC parameter will be introduced below and will not be redundantly described herein.

At step S403, the base station establishes a correspondence between the first preamble included in the random access preamble message and the TPC parameter.

For each of the first preambles, it has a corresponding random access preamble message and also a corresponding user terminal which sends the random access preamble message (first preamble). Therefore, establishing a correspondence between the first preamble and the TPC parameter in this step is equivalent to establishing a correspondence between the user terminal and the TPC parameter for adjusting the sending power of the user terminal.

At step S404, for each second preamble, the base station adds a TPC parameter corresponding to the second preamble to the random access response message, such that the user terminal selecting the second preamble uses the corresponding TCP parameter to adjust a sending power for subsequently sending an access request message.

Specifically, in a response to the user terminal corresponding to the second preamble, the TPC parameter for adjusting the sending power of the user terminal is sent to the user terminal together such that the user terminal adjusts, based on the TPC parameter, the sending power for subsequently sending an access request message.

Herein, the access request message (generally referred to as Msg3) may be an initial access request message or a re-access request message.

Specifically, if the user terminal is performing an initial access, the user terminal may use the TPC parameter to adjust the sending power of the initial access request message; if the user terminal is performing re-access, the user terminal may use the TPC parameter to adjust the sending power of the re-access request message.

Till now, the flow shown in FIG. 4 is completed.

It can be seen from the flow shown in FIG. 4 that, in the embodiments of the present disclosure, the sending power of the user terminal for sending an access request message (Msg3) is adjusted by using the received power and the desired power, which can effectively improve an analysis success rate of the base station, avoiding repeatedly performing the access flow due to analysis failure and thus further reducing the access latency.

The specific process of determining the TPC parameter in step S402 will be described below. As shown in FIG. 5, it shows an implementation flow of step S402 according to an embodiment of the present disclosure.

As shown in FIG. 5, the flow may include the following steps S501 to S503.

At step S501, the base station obtains a first power difference between the received power and the desired power.

At step S502, the base station obtains a second power difference by rounding a half of the first power difference.

Herein, the naming of the first power difference and the second power difference are only for ease of distinguishing rather than limitation.

As an embodiment, the steps S501 and S502 can be expressed in the following formula:

$$P_a = \lfloor (P_r - P_t)/2 \rfloor$$

where $P_r$ is the received power, Pt is the desired power, "$\lfloor \ \rfloor$" is a rounding-down sign, and $P_a$ is a power difference to be adjusted (second power difference).

At step S503, the base station queries for a TPC parameter corresponding to the second power difference in a correspondence between preset power differences and TPC parameters, and the TPC parameter corresponding to the second power difference is taken as the TPC parameter for adjusting the sending power of the user terminal.

Table 1 is an example of a mapping relationship between preset power differences and TPC parameters (i.e. a correspondence between power differences and TPC parameters).

TABLE 1

| TPC parameter | Power difference (db) |
|---|---|
| 0 | −6 |
| 1 | −4 |
| 2 | −2 |
| 3 | 0 |
| 4 | 2 |
| 5 | 4 |
| 6 | 6 |
| 7 | 8 |

Based on the second power difference obtained at step S502, the above mapping relationship table may be queried to obtain a TPC parameter corresponding to the second power difference as a finally-determined TPC parameter for adjusting the sending power of the user terminal.

Herein, it is to be further noted that if the second power difference obtained by the formula goes beyond a value range (e.g. −6 db to 8 db) of the preset power differences, a maximum or minimum value closest to the obtained second power difference is taken as the second power difference. For example, if the obtained second power difference is less than −6 db, −6 db is taken as the second power difference; if the obtained second power difference is greater than 8 db, 8 db is taken as the second power difference.

After the TPC parameter is sent to the user terminal in the step S304, the user terminal may determine a power difference corresponding to the TPC parameter by querying the same mapping relationship table (Table 1), and then based on the power difference, adjust the sending power of the user terminal for sending the access request message (Msg3).

Till now, the flow shown in FIG. 5 is completed.

Based on the flow shown in FIG. 5, the TPC parameter for adjusting the sending power can be accurately determined.

Further, due to small computation amount of this determination manner, system resources can be effectively saved and the processing efficiency can be increased, thus further reducing the access latency.

As an embodiment, when a re-access flow shown in FIG. 2 is performed between the user terminal and the base station, the re-access request message in step S204 may be improved in an embodiment of the present disclosure.

The re-access request message (MAC PDU) is usually formed of a plurality of sub-PDUs. In an existing processing manner, an MAC layer-based service data unit (MAC SDU) for data transmission is usually placed in the foremost sub-PDU included in the MAC PDU, and then an MAC layer-based control element (CE) for control information transmission is placed in a sub-PDU after the MAC SDU.

A user terminal identifier (e.g. Cell-Radio Network Temporary Identifier, (C-RNTI)), as an MAC CE, is usually present in the middle or back of the re-access request message (MAC PDU). Upon receiving the re-access request message (MAC PDU), the base station needs to perform continuous recursive search to obtain the user terminal identifier carried in the re-access request message, and then performs other processings on the user terminal. Undoubtedly, this will increase the processing time of the base station and also affects the re-access efficiency of the user terminal.

For the above problem, in an embodiment of the present disclosure, the user terminal may add the user terminal identifier (C-RNTI) to the first sub-PDU included in the re-access request message (MAC PDU).

After receiving the re-access request message in step S204, the base station may obtain an identifier of the user terminal which currently performs a re-access process by analyzing the first sub-PDU included in the re-access request message, thereby improving the re-access efficiency of the user terminal and reducing the re-access latency.

The above descriptions are made to the method of the embodiments of the present disclosure and an apparatus of the embodiments of the present disclosure will be described below.

FIG. 6 illustrates a random access apparatus 600 according to an embodiment of the present disclosure. The apparatus is applied to a base station. The apparatus includes: a sending unit 601, a receiving unit 602 and a selecting unit 603, where the sending unit 601 is configured to send a system message to user terminals, where the system message includes preamble ranges allocated for services, and priorities of services are pre-configured on the base station; the receiving unit 602 is configured to receive random access preamble messages from the user terminals, where the random access preamble message from a corresponding user terminal includes a first preambles selected by the user terminal from within the preamble ranges corresponding to services of the user terminal; the selecting unit 603 is configured to, based on the priority of the service corresponding to a preamble range to which each of obtained first preambles belongs, select at least one second preamble from the first preamble; the sending unit 601 is further configured to send a random access response message to the user terminals, and the random access response message includes the at least one second preamble.

As an embodiment, the apparatus further includes: an obtaining unit, configured to, for each of the received random access preamble messages, obtain a received power at the time of receiving the random access preamble message; a determining unit, configured to, based on the received power and a preset desired power, determine a transmit power control (TPC) parameter for adjusting a sending power of the corresponding user terminal; an establishing unit, configured to establish a correspondence between the first preamble included in the random access preamble message and the TPC parameter; an adding unit, configured to, for each second preamble, add the TPC parameter corresponding to the second preamble to the random access response message, such that the user terminal selecting the second preamble uses the corresponding TPC parameter to adjust a sending power for subsequently sending an access request message.

As an embodiment, based on the received power and the preset desired power, determining the transmit power control (TPC) parameter for adjusting the sending power of the corresponding user terminal includes: obtaining a first power difference between the received power and the desired power; obtaining a second power difference by rounding a half of the first power difference; querying for a TPC parameter corresponding to the second power differences in a correspondence between preset power difference and TPC parameters and taking the TPC parameter corresponding to the second power difference as the TPC parameter for adjusting the corresponding sending power of the user terminal.

As an embodiment, the receiving unit 602 is further configured to receive a re-access request message sent by the user terminal receiving the random access response message in a re-access process, where the re-access request message includes an identifier of the user terminal and the identifier of the user terminal is present in the first sub-protocol data unit (PDU) included in the re-access request message; and the apparatus further includes: an analyzing unit, configured to, by analyzing the first sub-PDU, obtain the identifier of the user terminal which currently perform the re-access process.

As an embodiment, the adding unit is further configured to, based on an ascending order of size of the second preambles, add each second preamble to the random access response message sequentially, such that the user terminal stop traversing upon traversing out a second preamble equal to or greater than the preamble of the user terminal in size; or, based on a descending order of size of the second preambles, add each second preamble to the random access response message sequentially, such that the user terminal stops traversing upon traversing out a second preamble equal to or less than the preamble of the user terminal in size.

Till now, the descriptions of the apparatus shown in FIG. 6 are completed.

It can be seen from the above that, in the embodiments of the present disclosure, different preamble ranges and different priorities are disposed for different services such that the user terminals select preambles from within preamble ranges corresponding to services borne by the user terminals and send the preambles to the base station. Thus, the base station responds to access of the user terminals based on a priority of a service corresponding to each obtained preamble. In this way, the accesses of the user terminals bearing the services of high priority (high requirements for latency) are responded preferentially, so as to improve the response efficiency of the entire system and reduce the access latency of the user terminals.

FIG. 7 is a schematic diagram illustrating a hardware structure of an electronic device 700 according to an embodiment of the present disclosure. As shown in FIG. 7, the hardware structure may include a processor 701 and a machine readable storage medium 702, where the machine readable storage medium 702 stores machine executable instructions executable by the processor 701, and the processor 701 is configured to execute the machine executable instructions to perform the method mentioned in the above embodiments of the present disclosure.

Based on the same application idea as the above method, an embodiment of the present disclosure further provides a non-transitory machine readable storage medium storing several computer instructions, where the computer instructions are executed by a processor to perform the method mentioned in the above embodiments of the present disclosure.

Illustratively, the machine readable storage medium mentioned herein may be any of electronic, magnetic, optical or other physical storage devices and may contain or store information such as executable instructions, data and so on. For example, the machine readable storage medium may be a Random Access Memory (RAM), a volatile or non-volatile Memory (RAM), a flash memory, a storage drive (e.g. hard disk drive), a solid state hard disk, any type of storage disk (e.g., compact disk, Digital Video Disk (DVD)), or a similar storage medium, or a combination thereof.

The foregoing disclosure is merely illustrative of preferred embodiments of the present disclosure but not intended to limit the present disclosure, and any modifications. Any changes, equivalent substitutions and improvements thereof made within the spirit and principles of one or more embodiments in the present disclosure shall be encompassed in the scope of protection of the present disclosure.

The invention claimed is:

1. A random access method, applied to a base station, and comprising:

sending a system message to user terminals, wherein the system message comprises preamble ranges allocated for services, and priorities of services are pre-configured on the base station;

receiving random access preamble messages from the user terminals, wherein the random access preamble message from a corresponding user terminal comprises a first preamble selected by the user terminal from within the preamble ranges corresponding to services of the user terminal;

based on the priority of the service corresponding to a preamble range to which each of the first preambles belongs, selecting at least one second preamble from the first preambles;

sending a random access response message to the user terminals, wherein the random access response message comprises the at least one second preamble;

wherein before sending the random access response message to the user terminals, the method further comprises:

based on an ascending order of size of the second preambles, adding each second preamble to the random access response message sequentially, such that the user terminal traverses the second preambles when receiving the random access response message and stops traversing upon traversing out a second preamble equal to or greater than the preamble of the user terminal in size; or, based on a descending order of size of the second preambles, adding each second preamble to the random access response message sequentially, such that the user terminal traverses the second preambles when receiving the random access response message and stops traversing upon traversing out a second preamble equal to or less than the preamble of the user terminal in size.

2. The method of claim 1, wherein before sending the random access response message to the user terminals, the method further comprises:

for each of the received random access preamble messages, obtaining a received power at the time of receiving the random access preamble message;

based on the received power and a preset desired power, determining a transmit power control (TPC) parameter for adjusting a sending power of the corresponding user terminal;

establishing a correspondence between the first preamble comprised in the random access preamble message and the TPC parameter;

for each second preamble, adding the TPC parameter corresponding to the second preamble to the random access response message, such that the user terminal selecting the second preamble uses the corresponding TPC parameter to adjust a sending power for subsequently sending an access request message.

3. The method of claim 2, wherein based on the received power and the preset desired power, determining the transmit power control (TPC) parameter for adjusting the sending power of the corresponding user terminal comprises:

obtaining a first power difference between the received power and the desired power;

obtaining a second power difference by rounding a half of the first power difference;

querying for a TPC parameter corresponding to the second power difference in a correspondence between preset power differences and TPC parameters and taking the TPC parameter corresponding to the second power difference as the TPC parameter for adjusting the corresponding sending power of the user terminal.

4. The method of claim 1, further comprising:

receiving a re-access request message sent by the user terminal receiving the random access response message in a re-access process, wherein the re-access request message comprises an identifier of the user terminal and the identifier of the user terminal is present in a first sub-protocol data unit (PDU) comprised in the re-access request message;

by analyzing the first sub-PDU, obtaining the identifier of the user terminal which currently perform the re-access process.

5. An electronic device, comprising a processor and a machine readable storage medium; wherein the machine readable storage medium stores machine executable instructions executable by the processor;

the processor is configured to execute the machine executable instructions to perform operations comprising:

sending a system message to user terminals, wherein the system message comprises preamble ranges allocated for services, and priorities of services are pre-configured on the base station;

receiving random access preamble messages from the user terminals, wherein the random access preamble message from a corresponding user terminal comprises a first preamble selected by the user terminal from within the preamble ranges corresponding to services of the user terminal;

based on the priority of the service corresponding to a preamble range to which each of the first preambles belongs, selecting at least one second preamble from the first preambles;

14 sending a random access response message to the user terminals, wherein the random access response message comprises the at least one second preamble;

wherein before sending the random access response message to the user terminals, the operations further comprise:

based on an ascending order of size of the second preambles, adding each second preamble to the random access response message sequentially, such that the user terminal traverses the second preambles when receiving the random access response message and stops traversing upon traversing out a second preamble equal to or greater than the preamble of the user terminal in size; or, based on a descending order of size of the second preambles, adding each second preamble to the random access response message sequentially, such that the user terminal traverses the second preambles when receiving the random access response message and stops traversing upon traversing out a second preamble equal to or less than the preamble of the user terminal in size.

6. A non-transitory machine readable storage medium, storing machine executable instructions, wherein the machine executable instructions are executed by a processor to perform operations comprising:

sending a system message to user terminals, wherein the system message comprises preamble ranges allocated for services, and priorities of services are pre-configured on the base station;

receiving random access preamble messages from the user terminals, wherein the random access preamble message from a corresponding user terminal comprises a first preamble selected by the user terminal from within the preamble ranges corresponding to services of the user terminal;

based on the priority of the service corresponding to a preamble range to which each of the first preambles belongs, selecting at least one second preamble from the first preambles;

sending a random access response message to the user terminals, wherein the random access response message comprises the at least one second preamble;

wherein before sending the random access response message to the user terminals, the operations further comprise:

based on an ascending order of size of the second preambles, adding each second preamble to the random access response message sequentially, such that the user terminal traverses the second preambles when receiving the random access response message and stops traversing upon traversing out a second preamble equal to or greater than the preamble of the user terminal in size; or, based on a descending order of size of the second preambles, adding each second preamble to the random access response message sequentially, such that the user terminal traverses the second preambles when receiving the random access response message and stops traversing upon traversing out a second preamble equal to or less than the preamble of the user terminal in size.

7. The electronic device of claim 5, wherein before sending the random access response message to the user terminals, the operations further comprise:

for each of the received random access preamble messages, obtaining a received power at the time of receiving the random access preamble message;

based on the received power and a preset desired power, determining a transmit power control (TPC) parameter for adjusting a sending power of the corresponding user terminal;

establishing a correspondence between the first preamble comprised in the random access preamble message and the TPC parameter;

for each second preamble, adding the TPC parameter corresponding to the second preamble to the random access response message, such that the user terminal selecting the second preamble uses the corresponding TPC parameter to adjust a sending power for subsequently sending an access request message.

8. The electronic device of claim 7, wherein based on the received power and the preset desired power, determining the transmit power control (TPC) parameter for adjusting the sending power of the corresponding user terminal comprises:

obtaining a first power difference between the received power and the desired power;

obtaining a second power difference by rounding a half of the first power difference;

querying for a TPC parameter corresponding to the second power difference in a correspondence between preset power differences and TPC parameters and taking the TPC parameter corresponding to the second power difference as the TPC parameter for adjusting the corresponding sending power of the user terminal.

9. The electronic device of claim 5, the operations further comprising:

receiving a re-access request message sent by the user terminal receiving the random access response message in a re-access process, wherein the re-access request message comprises an identifier of the user terminal and the identifier of the user terminal is present in a first sub-protocol data unit (PDU) comprised in the re-access request message;

by analyzing the first sub-PDU, obtaining the identifier of the user terminal which currently perform the re-access process.

* * * * *